(12) United States Patent
Vallender et al.

(10) Patent No.: US 10,160,336 B2
(45) Date of Patent: Dec. 25, 2018

(54) MULTIPHASE CONVERTER AUXILIARY POWER REDUCTION

(71) Applicant: GM GLOBAL TECHNOLOGY OPERATIONS LLC, Detroit, MI (US)

(72) Inventors: Joshua A. Vallender, Farmington, MI (US); Douglas S. Cesiel, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 380 days.

(21) Appl. No.: 15/147,416

(22) Filed: May 5, 2016

(65) Prior Publication Data

US 2017/0320395 A1 Nov. 9, 2017

(51) Int. Cl.
| | | |
|---|---|---|
| *B60L 11/18* | (2006.01) | |
| *B60L 11/02* | (2006.01) | |
| *H02M 7/04* | (2006.01) | |
| *H02M 7/08* | (2006.01) | |
| *H02M 1/00* | (2006.01) | |

(52) U.S. Cl.
CPC ........... *B60L 11/1811* (2013.01); *B60L 11/02* (2013.01); *B60L 11/1816* (2013.01); *B60L 11/1868* (2013.01); *H02M 7/04* (2013.01); *H02M 7/08* (2013.01); *B60L 2210/40* (2013.01); *H02M 2001/0032* (2013.01); *Y02B 70/16* (2013.01)

(58) Field of Classification Search
CPC ... B60L 11/1811; B60L 11/02; B60L 11/1816; H02M 7/04; H02M 7/08
USPC .......................... 307/9.1, 10.1; 320/103, 104
See application file for complete search history.

(56) References Cited

U.S. PATENT DOCUMENTS

| | | | | |
|---|---|---|---|---|
| 5,620,203 | A * | 4/1997 | Jeenicke | B60R 21/0133 |
| | | | | 280/735 |
| 7,906,866 | B2 * | 3/2011 | Anghel | F02N 11/04 |
| | | | | 307/10.1 |
| 8,054,051 | B2 * | 11/2011 | Nagata | H02P 9/006 |
| | | | | 290/40 R |
| 8,188,616 | B2 * | 5/2012 | Nordstrom | B60R 16/03 |
| | | | | 307/10.1 |
| 2009/0160259 | A1 * | 6/2009 | Naiknaware | H02M 7/4807 |
| | | | | 307/82 |
| 2014/0254218 | A1 * | 9/2014 | Santini | H02M 7/08 |
| | | | | 363/69 |

(Continued)

*Primary Examiner* — Thomas Skibinski
(74) *Attorney, Agent, or Firm* — Quinn IP Law

(57) ABSTRACT

An electrical system for use with an AC power supply having multiple phase voltages, e.g., three phase voltages, may include a high-voltage battery pack or other high-voltage DC device, a 12 VDC battery or other auxiliary-voltage DC device providing auxiliary power to the electrical system, multiple AC-DC converters, and a controller. The AC-DC converters each provide a DC output voltage to the high-voltage DC device, and are operable for converting a respective one of the phase voltages from the AC power supply into the DC output voltage. The controller selectively disables the AC-DC converters in response to a detected predetermined operating condition to thereby reduce consumption of the auxiliary power within the electrical system. A vehicle may include a high-voltage DC battery pack, an auxiliary-voltage DC battery providing auxiliary power, an onboard charging module, a charging port, an auxiliary power module, an electric machine, and a controller.

19 Claims, 3 Drawing Sheets

(56) References Cited

U.S. PATENT DOCUMENTS

| | | | |
|---|---|---|---|
| 2014/0354212 A1* | 12/2014 | Sugeno | H01M 10/441 320/103 |
| 2015/0183330 A1* | 7/2015 | Rajagopalan | B60L 11/1812 307/9.1 |
| 2015/0258946 A1* | 9/2015 | Namuduri | B60K 6/40 307/10.1 |

* cited by examiner

MULTIPHASE CONVERTER AUXILIARY POWER REDUCTION

TECHNICAL FIELD

The present disclosure relates to the reduction of auxiliary power consumption in an electrical system having a multiphase converter.

BACKGROUND

An electrical system may utilize both alternating current (AC) and direct current (DC) power. For instance, a powertrain of a battery electric or hybrid electric vehicle or other torque-generating system typically includes one or more high-voltage AC electric machines, each of which is powered by a DC device such as a multi-cell battery pack or a fuel cell. An AC-DC converter is used in such a system to perform the necessary power conversion functions. For instance, a passive diode bridge and actively-controlled switching elements such as MOSFETS or IGBTs may be used to eliminate the negative cycle of an AC input waveform, with the resultant voltage output thereafter filtered to provide a DC output waveform.

In some electrical systems using an AC power supply, recharging of a DC battery pack or powering of a DC device may be achieved by plugging the electrical system into an offboard charging port, such as an available AC wall outlet or charging station. For example, an AC-DC multiconverter system may be used in certain plug-in vehicles to convert an AC input voltage from a wall outlet or charging station into a DC voltage.

120/240 VAC single phase AC is widely available in the developed world as a residential voltage supply. In such a configuration, the AC voltage supply is a "split phase" supply in which the peak voltage relative to ground is 120 VAC or 240 VAC. In some locations, however, multiphase AC power is standard, e.g., three phase voltages and currents are provided that differ from each other by a third of a cycle or 120 electrical degrees. Therefore, conventional approaches to power conversion designed for single phase applications may be less than optimal when used with multiphase AC power.

SUMMARY

Disclosed herein is an electrical system having an AC-DC power converter device with multiple AC-DC converters and a controller in communication with each of the converters, with the power converter device referred to herein as an AC-DC multiconverter device. The controller is programmed to reduce auxiliary power consumption in the electrical system. The present disclosure is directed toward solving a particular problem that may be encountered in the implementation of multiphase power conversion using a primary AC-DC converter and multiple secondary AC-DC converters as explained below, with one converter handling power conversion for a corresponding electrical phase.

The present disclosure is intended to reduce auxiliary power consumption during certain periods of operation of the electrical system. To achieve the desired power reduction, the controller is programmed to selectively disable some or all of the secondary converters as needed when sensor data associated with the secondary converters, e.g., a voltage or current input into or output from the secondary converters, is not required in the overall control of the electrical system.

An example embodiment is disclosed herein of an electrical system for use with an AC power supply having multiple phase voltages, e.g., three phase voltages in a typical application. The electrical system may include a high-voltage battery pack or other high-voltage DC device, a 12 VDC battery or other auxiliary-voltage DC device providing auxiliary power to the electrical system, multiple AC-DC converters, and a controller. The AC-DC converters each provide a DC output voltage to the high-voltage DC device, and are operable for converting a respective one of the phase voltages from the AC power supply into the DC output voltage. The controller is programmed to selectively disable some or all of the AC-DC converters in response to a detected predetermined operating condition to thereby reduce consumption of the auxiliary power within the electrical system.

The electrical system may include a charging port configured to connect each of the AC-DC converters to the AC power supply.

The AC-DC converters may be optionally housed or contained within an AC-DC multiconverter system of a vehicle, e.g., a high-voltage battery charger module or an onboard charging module. In such an embodiment, the predetermined operating condition may be an active drive mode of the vehicle.

In a possible embodiment, the controller may be programmed to individually and directly enable or disable the AC-DC converters. Alternatively, the controller may be programmed to directly enable one of the AC-DC converters. In such a case, the enabled AC-DC converter may act as a primary converter by individually and directly enabling the remaining AC-DC converters to act as secondary converters.

Each of the primary and secondary AC-DC converters may include an electrical sensor that measures sensor data as an input or output voltage of the respective AC-DC converter with which the electrical sensor is used, e.g., an AC input or a DC output. The sensors may individually and directly communicate their sensor data to the controller. Alternatively, the sensors could individually and directly communicate their respective sensor data to the primary converter, with the primary converter in turn communicating all sensor data from itself and the secondary converters to the controller. The controller may be integrated with the primary converter.

The electrical system may also include an electric machine and a power inverter module, with the electric machine energized by the high-voltage DC device via the PIM.

A vehicle is also disclosed herein for use with a three-phase AC power supply. The vehicle may include a high-voltage DC battery pack, an auxiliary-voltage DC battery providing auxiliary power, an AC-DC multiconverter device, a charging port, and auxiliary power module (APM), an electric machine, and a controller. The AC-DC multiconverter device has a plurality of AC-DC converters each providing a DC output voltage to the high-voltage DC battery pack. Each AC-DC converter is operable for converting a respective phase voltage from the AC power supply into the DC output voltage. The charging port connects the multiconverter device to the AC power supply. The APM electrically connects the multiconverter device to the auxiliary DC battery and reduces the DC output voltage to a lower DC auxiliary voltage. The electric machine delivers an output torque to a driveline of the vehicle when energized by the high-voltage DC battery pack. The controller is programmed to detect a predetermined operating condition of the electrical system, and to selectively disable some or all of the AC-DC converters in response to the detected predetermined operating condition to thereby reduce consumption of the auxiliary power.

A method for reducing consumption of auxiliary power within the electrical system described above includes detecting a predetermined operating condition of the electrical system via a controller and selectively disabling the AC-DC converters in response to the detected predetermined operating condition to reduce consumption of the auxiliary power within the electrical system.

The above features and advantages and other features and advantages of the present disclosure are readily apparent from the following detailed description of the best modes for carrying out the invention when taken in connection with the accompanying drawings.

DETAILED DESCRIPTION

Figure 1:
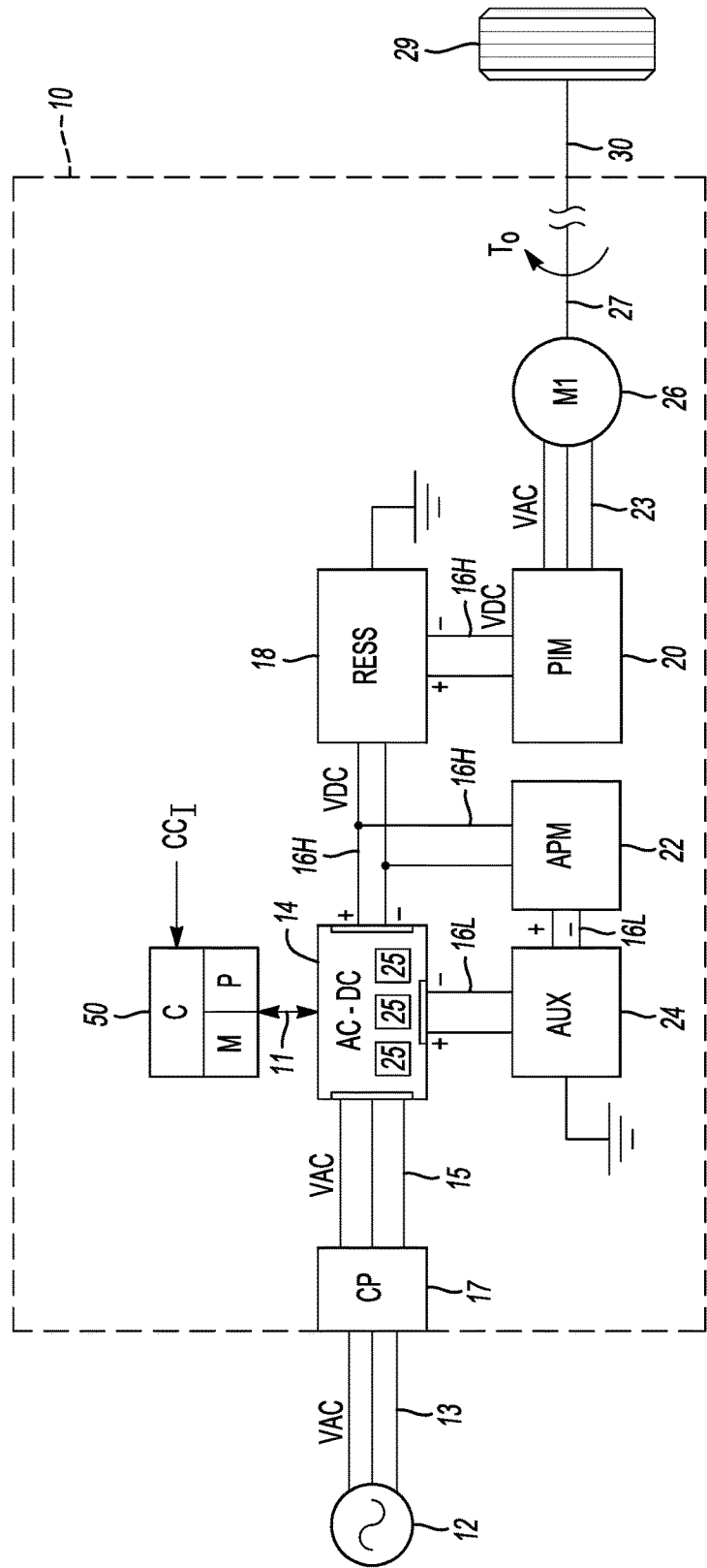
FIG. 1 is a schematic illustration of an electrical system having multiple AC-DC converters and a controller programmed to reduce auxiliary power usage in the electrical system.

Referring to the drawings, wherein like reference numbers refer to like components throughout the several views, FIG. 1 depicts a schematic example electrical system 10 having a direct current (DC) device 18, e.g., a rechargeable energy storage system (RESS) or multi-cell battery pack as shown, a fuel cell, or any other DC-powered device. The DC device 18 may be electrically connected to a multiphase alternating current (AC) power supply 12 using a charging port (CP) 17 and an AC-DC multiconverter device 14 (labeled AC-DC) of the type described below. The AC power supply 12 provides a multiphase voltage (VAC) to the charging port 17 via an electrical cable 13, typically with three phase wires as shown and a fourth neutral/ground wire (not shown). For example, the electrical system 10 may be embodied as or may be an integral part of a plug-in vehicle in which the charging port 17 is plugged into a wall outlet or charging station when the vehicle is idle so as to charge the DC device 18.

The AC-DC multiconverter device 14, e.g., an example high-voltage battery charger or onboard charging module, includes a plurality of AC-DC converters 25. The multiconverter device 14 provides a DC output voltage (VDC) to the DC device 18 via a high-voltage DC bus 16H. Each individual converter 25 of the multiconverter device 14 converts AC power for a particular electrical phase, i.e., receives a corresponding phase voltage from the AC power supply 12 over a corresponding wire of an AC input cable 15 (VAC), via the charging port 17, and converts the received phase voltage into the DC output voltage (VDC), which is transmitted to the DC device 18, e.g., for charging of individual battery cells of the DC device 18 when embodied as a multi-cell battery pack or for powering the DC device 18 in other embodiments.

As is well understood in the art, each AC-DC converter 25 includes a number of internal electronic components that work together in concert to convert a respective phase voltage from the AC power supply 12 into the DC voltage output (VDC). Although omitted for illustrative simplicity, such internal structure typically includes elements such as input and output waveform filters, passive diode bridges, semiconductor switches such as MOSFETs or IGBTs, a link capacitor, and a transformer. Of these components, the semiconductor switches have on/off switching states that can be commanded by a controller (C) 50 to turn the converters 25 on or off as needed, with all of the converters 25 typically turned on or enabled when the electrical system 10 is electrically connected to the AC power supply 12, as well as when sensory data is required from a given one of the converters 25. By shutting off or disabling some or all of the converters 25 when the electrical system 10 is in operation and not connected to the AC power supply 12, e.g., all but one converter 25 in some embodiments, the controller 50 is able to reduce auxiliary power usage. For instance, typical converters 25 use about 10 W of auxiliary power to collect and relay their sensor data to the controller 50 via a communications bus (double-headed arrow 11). The controller 50 is thus programmed to determine precisely when this control action should occur.

The electrical system 10 of FIG. 1 may also include a high-voltage polyphase electric machine (M1) 26 in the form of an electric traction motor or a motor generator unit. The electric machine 26 may deliver output torque (arrow $T_O$) to a rotor shaft 27 to perform work, such as but not limited to propelling one or more drive wheels 29 of a vehicle via a transmission output shaft 30 or powering a load in another torque system. As the electric machine 26 uses energy from the DC device 18 that is supplied via the DC high-voltage bus 16H, the electrical system 10 may additionally include a power inverter module (PIM) 20 operable for converting a DC output voltage (VDC) from the DC device 18 into a multiphase AC output voltage (VAC) suitable for powering the electric machine 26. The AC output voltage is then provided to the electric machine 26 via a multiphase AC voltage bus 23. Although not shown in FIG. 1, it is well known in the art that DC-AC power inverters use pulse-width modulation or other semiconductor switching techniques to control semiconductors switches within the PIM 20 to produce a desired AC waveform.

The electrical system 10 additionally includes a low-voltage or auxiliary-voltage DC voltage bus 16L, typically 12-15 VDC. Thus, the term "high-voltage" as used herein refers to a voltage level that is higher than such auxiliary voltage levels. The actual voltage level of the high-voltage DC bus 16H will vary with the application. For instance, certain plug-in electric vehicle applications may use voltage levels of at least 300 VDC, while mild hybrids and other configurations may use voltage levels that are considerably lower, e.g., about 48 VDC.

In all configurations contemplated herein, the sensor and power conversion functionality of the AC-DC multiconverter device 14 is powered by an auxiliary voltage from an auxiliary-voltage device (AUX) 24 such as a 12 VDC battery and/or an auxiliary power module (APM) 22 via the low-voltage DC bus 16L. A possible configuration is shown in FIG. 1 in which the APM 22 is electrically connected to the high-voltage DC bus 16H. The APM 22, which may be embodied as a conventional DC/DC converter providing power flow between the voltage busses 16L and 16H, provides auxiliary power to 12 VDC accessory loads and electronic control modules within the electrical system 10, including the controller 50 and the individual converters 25 as explained below.

The controller 50 includes a processor (P) and memory (M). The memory M includes tangible, non-transitory memory, e.g., read only memory, whether optical, magnetic, flash, or otherwise. The controller 50 also includes sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry.

As set forth below, the controller 50 is programmed to detect a predetermined operating condition of the electrical system 10, e.g., via input signals (arrow $CC_I$) indicative of such a condition, for instance battery charge information, ignition or key on/off state, charging state, or any other data indicative of or helpful in determining the predetermined operating condition, and to selectively disable some or all but one of the converters 25 in response to the detected predetermined operating condition. In this manner, the controller 50 is able to reduce auxiliary power usage in the electrical system 10.

As explained below with reference to FIGS. 3-6, in various embodiments the controller 50 may be part of or in direct communication with one of the converters 25, with that converter 25 relaying enabling/disabling instructions to the remainder of the converters 25, thus rendering that particular converter 25 a "primary converter" of the AC-DC multiconverter device 14, and in turn rendering all other converters 25 in the multiconverter device 14 as "secondary converters". Structurally, however, the converters 25 are otherwise identically configured.

Figure 2:
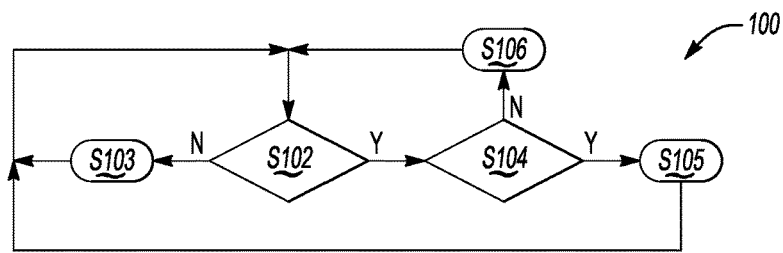
FIG. 2 is a flow chart describing an example method for reducing auxiliary power usage in the electrical system depicted in FIG. 1.

Referring briefly to FIG. 2, in order to achieve the above-mentioned auxiliary power reduction, the controller 50 is programmed to execute a method 100 to selectively and individually enable the converters 25 only when their respective sensor data is required. Therefore, at step S102 the controller 50 first detects, for the AC-DC converter device 14 as a whole, a predetermined operating condition of the electrical system 10 and determines whether sensor data is required from any of the converters 25 for such an operating condition. For instance, sensor data may include the AC input voltage or DC output voltage, with the individual converters 25 having sensors (S1, S2, S3) in the form of voltage sense circuits or individual current or voltage sensors that can be used to measure or calculate the reported voltages. However, as shown in FIG. 1, all DC outputs are tied together and thus are the same, and therefore sensor data is only required from one converter 25 to determine the DC output voltage from the AC-DC multiconverter device 14.

During charging operations, the controller 50 may require such sensor data reporting the AC input voltage supplied to each converter 25. At other times during operation of the electrical system 10, the controller 50 may periodically require sensor data from any or all of the converters 25, e.g., for diagnostic purposes during a drive event when not actively charging the DC device 18 of FIG. 1. The controller 50 may require sensor data at the start of each drive cycle, or may require periodic sensor readings to monitor a state of the electrical system 10 or external conditions. Likewise, some reduced-power modes may require minimal amounts of such sensor data. The method 100 proceeds to step S104 if sensor data is required from any of the converters 25. The method 100 proceeds in the alternative to step S103 when sensor data is not required, e.g., when the electrical system 10 is not used over an extended period for any purpose.

Step S103 includes disabling all of the converters 25 of the AC-DC multiconverter device 14 via the controller 50 and then returning to step S102.

Step S104 includes determining which of the converter(s) 25 are required to provide sensor data. The criteria used at step S104 may be the same as the operating condition consideration employed in step S102, e.g., whether the electrical system 10 is actively consuming power from the DC device 18, such as in an active vehicle electric drive mode or when diagnostics are being performed on a given converter 25. The method 100 proceeds to step S105 if sensor data is required for a given converter 25. Otherwise, the method 100 proceeds to step S106.

At step S105, the controller 50 selectively enables the particular converter 25 whose sensor data is required. Step S105 may entail transmitting a binary enablement signal to the affected converter 25 to request reporting of sensor data from the converter 25. If a power conversion operation of the converter 25 is also required, a control signal may be transmitted to the converter 25 as set forth below. The method 100 then returns to step S102.

Step S106 includes selectively disabling the particular converter 25 whose sensor data is not required. Step S106 may entail transmitting a binary enablement signal to the affected converter 25 to request disabling of that the converter 25, with the converter 25 powering down or turning off. The method 100 then returns to step S102 and repeats steps S102-S106 in a loop, thereby individually evaluating the need for sensor data from each of the converters 25 in a calibrated control loop.

Figure 3:
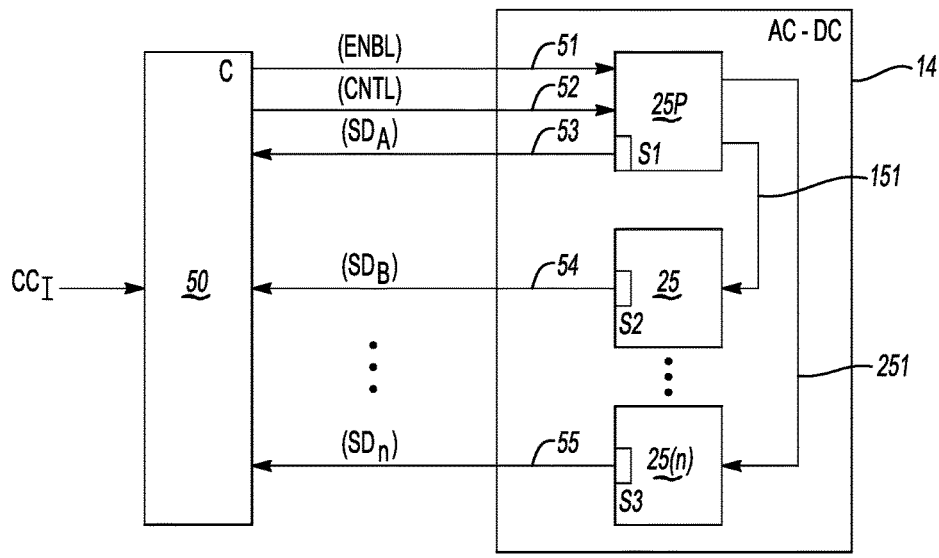
FIGS. 3-6 are schematic illustrations of different example embodiments for implementing the method of FIG. 2 using the electrical system of FIG. 1.
Figure 4:
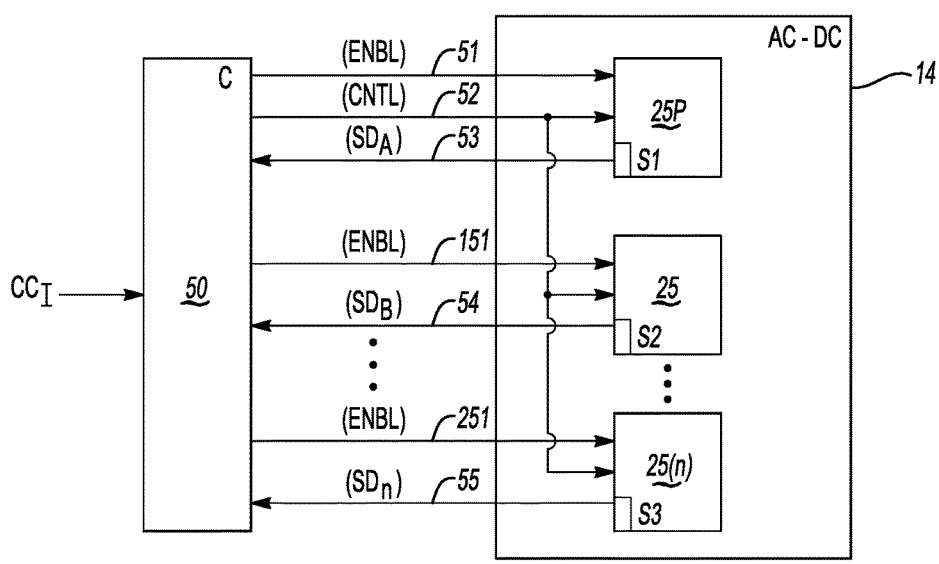
Figure 5:
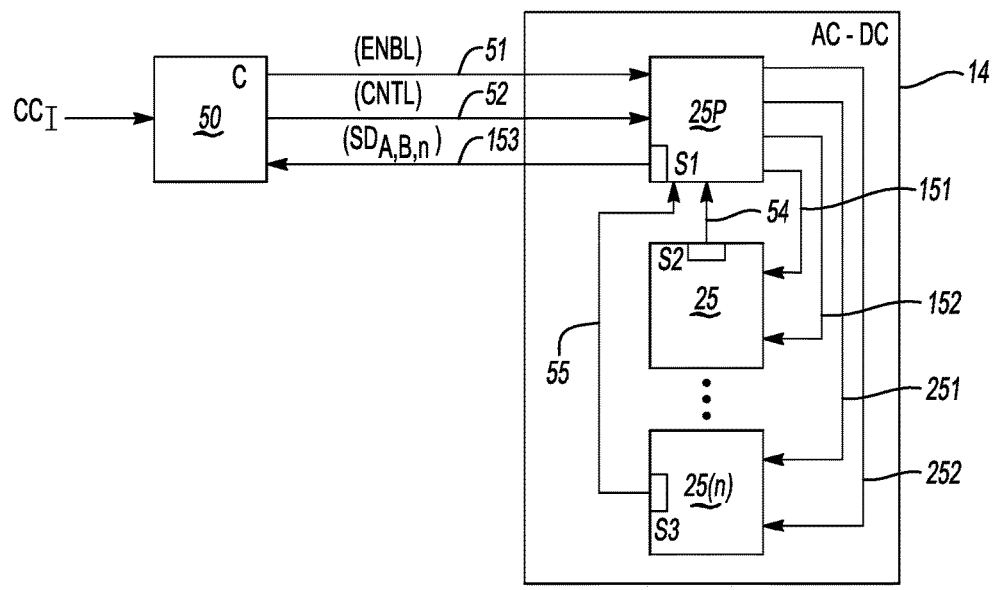
Figure 6:
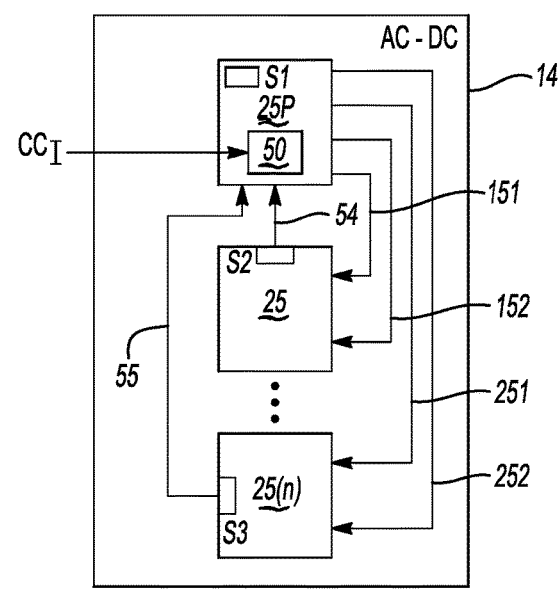

FIGS. 3-6 depict different possible implementations for achieving the above-described control functionality. In particular, FIGS. 3-5 depicts embodiments in which the controller 50 resides external to the individual converters 25. FIG. 6 depicts an embodiment in which the controller 50 is integrated with the primary converter 25P. The controller 50 in these embodiments may be, by way of example, a battery management system of the type known in the art.

Referring to FIG. 3, in response to receipt of the input signals (arrow CO the controller 50 may be programmed to transmit an enable command (ENBL) 51 to a designated primary converter 25P, e.g., as a binary signal, with 1 corresponding to an enabled state and 0 to a disabled state. Auxiliary power to the converter 25 is discontinued when the enable command 51 is discontinued, e.g., by breaking of a circuit connection with the auxiliary battery 24 of FIG. 1 via operation of a mechanical switch (not shown) within the converter 25P.

The controller 50 can also transmit control signals (CNTL) 52 to the primary converter 25P when needed to control AC-DC power conversion functionality of the enabled primary converter 25P. The control signals 52 command a particular calibrated current/voltage/power to one or more of the converters 25. In return, the primary converter 25P transmits sensor data $(SD_A)$ 53 to the controller 50, e.g., voltage or current readings specific to the primary converter 25P, for use in diagnosing and controlling the primary converter 25P. In a daisy-chain fashion, the primary converter 25P may control the enablement state of the (n) additional or secondary converters 25 through 25(n), i.e., the $n^{th}$ converter 25. Typically, the multiphase power referred to herein is three-phase power, in which case three converters 25 would be used. However, fewer or more electrical phases may be used within the intended inventive scope.

The primary converter 25P may be configured to individually and directly enable or disable all remaining converters 25, 25(n) as secondary converters as needed, e.g., by transmitting separate enable commands 151 and 251 to the secondary converters 25, 25(n) as shown in order to command the on state of these devices and terminating the enable commands 151 and 251 to disable the devices. To provide such functionality, the controller 50 may be programmed to individually and directly enable or disable each of the AC-DC converters 25 as shown in FIG. 4, or to do so indirectly via the primary converter 25P as shown in FIGS. 3, 5, and 6. The primary converter 25P may remain on in operation to report the DC output voltage as its sensor data ($SD_A$) while at the same time instructing the secondary converters 25, 25(n) to turn off. In turn, when enabled the secondary converters 25, 25(n) transmit their respective sensor data ($SD_B$) 54 and ($SD_n$) 55 back to the controller 50.

The particular configuration of FIG. 3 may be replaced by that of FIG. 4 such that the controller 50 individually and directly controls the enable states of the secondary converters 25, 25(n) as noted above in the same manner as the primary converter 25P in FIG. 3, i.e., via enable commands 51, 151, and 251. The controller 50 may also transmit a control signal 52 to the converters 25 to control operation. In such an embodiment, the converters 25P, 25, and 25(n) can transmit their respective sensor data 52, 54, 55 individually and directly to the controller 50, i.e., without relaying such data through the primary converter 25P.

FIG. 5 depicts an alternative embodiment in which the sensor data ($SD_{A,B,n}$) 153 from the respective converters 25P, 25, 25(n) is relayed to the controller 50 via the primary converter 25P. That is, the secondary converter 25 transmits its sensor data 54 to the primary converter 25P, as does any other converter up to and including the $n^{th}$ converter 25(n) with its sensor data 55. Control signals 52 are transmitted to the primary converter 25P, with the primary converter 25P thereafter transmitting control signals 152 and 252 to the respective secondary converters 25 and 25(n).

The embodiment of FIG. 6 is identical to that of FIG. 5 with one key exception: the controller 50 may be integrated with the primary converter 25P, e.g., as an integrated circuit. In this manner, the control functionality of the controller 50 may be combined with that of the AC-DC multiconverter device 14.

In view of the above-described electrical system 10, one of ordinary skill in the art will appreciate that a method for reducing consumption of auxiliary power within the electrical system 10 within a vehicle or other top-level system may be conceived that includes detecting the predetermined operating condition of the electrical system 10 via the controller 50 of FIG. 1, and then selectively disabling some or all but one of the AC-DC converters 25 in response to the detected predetermined operating condition in order to thereby reduce consumption of the auxiliary power within the electrical system. As noted above, the predetermined operating condition may be any condition in which the DC device is not being actively charged via the multiconverter device and the AC power supply.

As will be appreciated by those of ordinary skill in the art, the approach detailed above may be used to reduce auxiliary power consumption of an AC-DC multiconverter device 14 in three-phase or other multiphase implementations. In an example 12 VDC auxiliary application in which each phase uses 7 W of power, the selective disabling of two of the three converters 25 would save 14 W of power over the duration of the disablement. In this manner, converters 25 designed for single-phase applications may be extended to multiphase applications while ensuring the power saving benefits disclosed above.

While the best modes for carrying out the disclosure have been described in detail, those familiar with the art to which this invention relates will recognize various alternative designs and embodiments for practicing the disclosure within the scope of the appended claims.

The invention claimed is:

1. An electrical system for use with an alternating current (AC) power supply having multiple phase voltages, the electrical system comprising:
 a high-voltage direct current (DC) device;
 an auxiliary-voltage DC device providing auxiliary power to the electrical system;
 a plurality of AC-DC converters each providing a DC output voltage to the high-voltage DC device, wherein each of the AC-DC converters is operable for converting a respective one of the phase voltages from the AC power supply into the DC output voltage; and
 a controller programmed to detect a predetermined operating condition of the electrical system, and to selectively disable some or all of the AC-DC converters in response to the detected predetermined operating condition to thereby reduce consumption of the auxiliary power by the AC-DC converters within the electrical system.

2. The electrical system of claim 1, wherein the multiple phase voltages include three phase voltages.

3. The electrical system of claim 1, further comprising a charging port configured to connect each of the AC-DC converters to the AC power supply.

4. The electrical system of claim 3, wherein the AC-DC converters are housed or contained within a high-voltage battery charging module of a vehicle, and wherein the predetermined operating condition is an active drive mode of the vehicle.

5. The electrical system of claim 1, wherein the high-voltage DC device is a multi-cell battery pack and the auxiliary-voltage DC device is a 12 VDC battery.

6. The electrical system of claim 1, wherein the controller is programmed to individually and directly enable or disable each of the AC-DC converters.

7. The electrical system of claim 1, wherein the controller is programmed to directly enable one of the AC-DC converters, and wherein the enabled AC-DC converter is configured to act as a primary converter by individually and directly enabling some or all remaining AC-DC converters of the plurality of AC-DC converters as secondary converters.

8. The electrical system of claim 7, wherein each of the primary and secondary AC-DC converters includes an electrical sensor configured to measure sensor data as an input or output voltage of the respective AC-DC converter with which the electrical sensor is used, and to individually and directly communicate the sensor data to the controller.

9. The electrical system of claim 7, wherein each of the primary and secondary AC-DC converters includes an electrical sensor configured to measure sensor data as an input or output voltage of the respective AC-DC converter with which the electrical sensor is used, the electrical sensors of the secondary converters are configured to individually and directly communicate their respective sensor data to the primary converter, and the primary converter is configured to communicate the sensor data from the primary converter and the secondary converters to the controller.

10. The electrical system of claim 7, wherein the controller is integrated with the primary converter.

11. The electrical system of claim 1, further comprising an electric machine and a power inverter module, wherein the electric machine is energized by the high-voltage DC device via the PIM.

12. A vehicle for use with a three-phase alternating current (AC) power supply, the vehicle comprising:
- a high-voltage direct current (DC) battery pack;
- an auxiliary-voltage DC battery providing auxiliary power;
- a high-voltage battery charging module having a plurality of AC-DC converters each providing a DC output voltage to the high-voltage DC battery pack, wherein each AC-DC converter is operable for converting a respective phase voltage from the AC power supply into the DC output voltage;
- a charging port configured to connect the high-voltage battery charging module to the AC power supply;
- an auxiliary power module electrically connecting the high-voltage battery charging module to the auxiliary DC battery and operable for reducing the DC output voltage to a lower DC auxiliary voltage;
- an electric machine configured to deliver an output torque to a driveline of the vehicle when the electric machine is energized by the high-voltage DC battery pack; and
- a controller programmed to detect a predetermined operating condition of the electrical system, and to selectively disable some or all of the AC-DC converters in response to the detected predetermined operating condition to thereby reduce consumption of the auxiliary power by the AC-DC converters.

13. The vehicle of claim 12, wherein the controller is programmed to individually and directly enable or disable each of the AC-DC converters.

14. The vehicle of claim 12, wherein the controller is programmed to directly enable one of the AC-DC converters, and wherein the enabled AC-DC converter is configured to act as a primary converter that individually and directly enables some or all of the remaining converters of the plurality of converters as secondary converters.

15. The vehicle of claim 14, wherein the primary converter and the secondary converters each include sensors configured to measure an input and an output voltage of the respective AC-DC converter with which the electrical sensor is used, and to communicate the sensor data directly to the controller.

16. The vehicle of claim 14, wherein the primary converter and the secondary converters each include sensors configured to measure an input and an output voltage of the respective AC-DC converter with which the electrical sensor is used, the sensors of the secondary converters are configured to provide their sensor data directly to the primary converter, and the primary converter is configured to provide the sensor data for the primary and secondary converters to the controller.

17. The vehicle of claim 14, wherein the controller is integrated with the primary converter.

18. A method for reducing consumption of auxiliary power within an electrical system configured for use with an alternating current (AC) voltage supply having multiple phase voltages, wherein the electrical system includes a high-voltage direct current (DC) device, an auxiliary-voltage DC device providing auxiliary power to the electrical system, and a plurality of AC-DC converters each providing a DC output voltage to the DC device, wherein each AC-DC converter is operable for converting a respective phase voltage from the AC voltage supply into the DC output voltage, the method comprising:
- detecting a predetermined operating condition of the electrical system via a controller; and
- selectively disabling some or all of the AC-DC converters via the controller in response to the detected predetermined operating condition to thereby reduce consumption of the auxiliary power by the AC-DC converters within the electrical system.

19. The method of claim 18, wherein the electrical system is part of a vehicle, and wherein the predetermined operating condition is a condition in which the vehicle is not actively charging the DC device via the AC power supply.

\* \* \* \* \*